United States Patent
Diena et al.

(10) Patent No.: US 9,416,247 B2
(45) Date of Patent: Aug. 16, 2016

(54) FIBER-REINFORCED POLYURETHANE COMPOSITE PLATES

(75) Inventors: Paolo Diena, Modena (IT); Carlo Cocconi, Correggio (IT); Luigi Bertucelli, Reggio Emilia (IT)

(73) Assignee: Dow Global Technologies LLC, Midland, MI (US)

( * ) Notice: Subject to any disclaimer, the term of this patent is extended or adjusted under 35 U.S.C. 154(b) by 380 days.

(21) Appl. No.: 13/983,054

(22) PCT Filed: Feb. 1, 2012

(86) PCT No.: PCT/EP2012/051677
§ 371 (c)(1),
(2), (4) Date: Jul. 31, 2013

(87) PCT Pub. No.: WO2012/104343
PCT Pub. Date: Aug. 9, 2012

(65) Prior Publication Data
US 2013/0316161 A1 Nov. 28, 2013

(30) Foreign Application Priority Data
Feb. 4, 2011 (IT) .............................. MI2011A0157

(51) Int. Cl.
| | | |
|---|---|---|
| C08K 3/40 | (2006.01) | |
| C08J 5/04 | (2006.01) | |
| C08J 5/24 | (2006.01) | |
| B29C 67/00 | (2006.01) | |
| C08G 18/66 | (2006.01) | |
| C08G 18/08 | (2006.01) | |
| C08G 18/48 | (2006.01) | |

(52) U.S. Cl.
CPC .............. *C08K 3/40* (2013.01); *B29C 67/0011* (2013.01); *C08G 18/0885* (2013.01); *C08G 18/4816* (2013.01); *C08G 18/6696* (2013.01); *C08J 5/043* (2013.01); *C08J 5/24* (2013.01); *C08G 2120/00* (2013.01); *C08J 2375/08* (2013.01)

(58) Field of Classification Search
CPC B29C 67/0011; B29C 67/00; C08G 18/0885; C08G 18/4816; C08G 18/6696; C08G 2120/00; C08J 2375/08; C08J 5/043; C08J 5/24; C08K 3/40
USPC ........ 264/109, 128; 428/220, 297.4; 524/261, 524/590
See application file for complete search history.

(56) References Cited

U.S. PATENT DOCUMENTS

| | | |
|---|---|---|
| 5,132,069 A | 7/1992 | Newton |
| 5,378,078 A | 1/1995 | Lewis |
| 5,439,627 A | 8/1995 | DeJager |
| 5,529,431 A | 6/1996 | Walsh |
| 6,656,405 B1 | 12/2003 | Debergh |
| 6,696,160 B2 | 2/2004 | Partusch |
| 6,761,953 B2 | 7/2004 | Haas |
| 2005/0170189 A1 | 8/2005 | Haas |
| 2005/0280173 A1 | 12/2005 | Wirtz |
| 2007/0098997 A1 | 5/2007 | Younes |
| 2007/0110979 A1* | 5/2007 | Clark ...................... B29C 70/30 428/292.1 |
| 2007/0160793 A1* | 7/2007 | Cageao .............. B62D 25/2054 428/36.9 |
| 2008/0020194 A1 | 1/2008 | Younes |

FOREIGN PATENT DOCUMENTS

EP    1253006 B    10/2003

OTHER PUBLICATIONS

Steinberger, "Glassfaserverstaerkte Thermoplastische Polyurethane", Kunstoffe International, Carl Hanser Verlag, Munich, Germany, vol. 82. No. 12, Dec. 1, 1992, pp. 1181-1183.

* cited by examiner

*Primary Examiner* — Arti Singh-Pandley
(74) *Attorney, Agent, or Firm* — Gary C Cohn PLLC

(57) ABSTRACT

Fiber-reinforced polyurethane composite plates having a thickness of at least 12 mm contains at least 20% by weight of reinforcing fibers embedded in a polyurethane polymer matrix, which polyurethane polymer matrix has a calculated molecular weight between crosslinks of from 450 to 2500. The composite plates have excellent load-bearing properties and exhibit small permanent sets upon loading.

6 Claims, No Drawings

FIBER-REINFORCED POLYURETHANE COMPOSITE PLATES

This invention relates to fiber-reinforced polyurethane composite plates, and to methods for making those plates.

Heavy load-bearing plates are used in many applications. These plates are sometimes used as temporary or permanent surfaces that support vehicular or pedestrian traffic. These plates also find use in construction applications, as reinforcing materials and in applications such as gratings, sewage covers, decking and ship hulls. The plates are usually called upon to bear large applied loads, and do so without permanently deforming. Often, there are in place government-mandated performance standards for load-bearing and permanent set that must be met in specific applications.

These plates are typically made of metals (mostly cast iron or steel) or concrete, because of the large load-bearing capacity that is required. Metal and concrete plates have the disadvantage of being very heavy. Their weight can make the plates very difficult to handle. Even small plates often are so heavy that they cannot be easily removed manually. The strain of lifting these plates is thought to contribute to many musculoskeletal complaints among workers who handle them. An additional problem with metal plates is that the metals have significant scrap value, and for that reason the plates are often stolen so they can be sold as scrap.

Composite plates potentially provide the advantages of lower weight and low scrap value. These composites include a reinforcement, typically a fibrous type, which is embedded in a polymeric matrix. The challenge with composite plates is to achieve the mechanical strength that is needed. To achieve this high strength, composite plates have been made using a specialized reinforcement made up of fibers that are assembled into a continuous fiber strand, as described in U.S. Pat. No. 6,656,405. Reinforcing layers are made by forming the fiber strand into straight and parallel rows. These layers are stacked in a mold, with spacers interposed between adjacent layers. A curable resin material is then injected into the mold and cured to form the composite. In this manner, adequate mechanical strength can be achieved.

A problem with the foregoing approach is that it requires a specialized reinforcing material as well as a spacer material. These add significantly to the raw materials cost. Production costs are high, too, because the reinforcing and spacer layers must be stacked inside the mold, which increases the complexity of the process and the cycle time.

A more cost-effective way of producing composite plates that have the requisite mechanical strength is desired.

This invention is in one aspect a fiber-reinforced polyurethane composite plate having a thickness of at least 12 mm, wherein the fiber-reinforced polyurethane composite contains at least 30% by weight of reinforcing fibers embedded in a polyurethane polymer matrix, which polyurethane polymer matrix has a calculated molecular weight between crosslinks of from 430 to 2500.

Applicants have surprisingly found that plates having very high mechanical strength are produced when the polymer matrix is a polyurethane having a calculated molecular weight between crosslinks of from 430 to 2500. By selection of the polyurethane polymer matrix, high mechanical strengths can be obtained even using simple and inexpensive reinforcements such as randomly oriented short (up to 150 mm) length fibers, continuous rovings, simple non-woven or woven fiber mats and the like. This allows production methods to be simplified and production costs to be lowered. In particular embodiments, the plate is made via a spraying process (such as the Kraus-Maffei "LFI" process), in which fibers wetted with a polyurethane-forming composition are sprayed into a mold or onto a form, followed by closing the mold or otherwise applying pressure to the composition and curing the polyurethane-forming composition in the mold or on the form. Alternatively, the plate can be manufactured using techniques such as the structural reaction injection molding (SRIM) process, in which a fiber reinforcement is introduced into a mold, the mold is closed, and a polyurethane-forming composition is injected into the mold where it cures to form a composite. Another suitable manufacturing method is a reinforced reaction injection molding (RRIM) process, in which the fibers are dispersed in a liquid polyurethane precursor, which is passed through a mixhead where the precursor mixes with other reactants and then injected into a closed mold where it is cured.

Other advantages of the invention include a high glass transition temperature, which allows use in a broad range of temperatures, low water absorption and low surface flammability.

The composite plate of the invention includes a fiber-reinforced polyurethane composite that is at least 12 mm thick. The composite plate may further contain other layers or components, such as, for example, a coating layer that may impart useful properties such as weather stability, a higher coefficient of friction (for skid or slip resistance) or for aesthetic reasons. The plate may also include functional parts such as handles.

The shape of the composite plate is not considered to be critical to the invention generally, although specialized shapes may be required for specific applications. Therefore, the composite shape may be rectangular or other regular or irregular polygon, circular, elliptical, or any other useful shape.

The fiber-reinforced polyurethane composite may have a thickness of 12 mm or more, preferably 15 mm or more, more preferably 25 mm or more, up to 100 mm, preferably up to about 50 mm. The fiber-reinforced polyurethane composite may be made up of two or more thinner layers that are stacked and adhered together.

The plate typically will have a clear opening, having a thickness as described above, of at least 150 mm and often at least 250 mm. The clear opening is typically as much as 2 meters, and more typically is up to about 1 meter. The clear opening is the diameter of the largest circle that can be inscribed in the unobstructed area of the plate between seatings (if any). The plate may have thicker or thinner portions, such as, for example, a raised rim. Plates such as gratings may have thin sections or even openings within the clear area.

The fiber-reinforced polyurethane composite includes at least 20%, by weight of reinforcing fibers embedded in a polyurethane polymer matrix. The reinforcing fibers may constitute up to 60% of the total weight of the fiber-reinforced composite. When the fibers are present in the form of a woven mat (as is often the case when the composite is made via an SRIM process), they preferably constitute from 20 to 50% of the weight of the composite. When the fibers are randomly oriented short (less than 150 mm in length) fibers (as is usually the case when the composite is made via a spraying process or RRIM process), they preferably constitute at least 30%, more preferably at least 35% and still more preferably at least 40% of the weight of the composite, preferably up to 55% and more preferably up to 50% of the weight thereof.

The polyurethane polymer matrix is characterized in having a calculated molecular weight between crosslinks of from 430 to 2500. The polyurethane polymer matrix is a reaction product of isocyanate compounds with isocyanate-reactive compounds. The calculated molecular weight between crosslinks ($M_c$) takes into account the functionality (number of isocyanate or isocyanate-reactive groups per molecule) and equivalent weight of those polyisocyanate compounds and of those isocyanate-reactive compounds, together with the isocyanate index, as follows:

$$M_c = \frac{W_{pol} + W_{iso}}{\frac{W_{pol}(F_{pol} - 2)}{E_{pol} \times F_{pol}} + \frac{W_{iso,stoic}(F_{iso} - 2)}{E_{iso} \times F_{iso}} + \frac{W_{iso,excess}(F_{iso} - 1)}{E_{iso}(F_{iso} + 1)}}$$

where:

$M_c$ is the calculated molecular weight between crosslinks;

$W_{pol}$ is the weight in grams of all isocyanate-reactive compounds;

$W_{iso}$ is the weight in grams of all polyisocyanate compounds;

$F_{pol}$ is the number average functionality (number of isocyanate-reactive groups per molecule) of the isocyanate-reactive compounds. Nominal functionalities are used for purposes of this calculation;

$E_{pol}$ is the average equivalent weight, per isocyanate-reactive group, of all isocyanate-reactive compounds.

$W_{iso,stoic}$ is the weight of the polyisocyanate compounds when the isocyanate index is 100 or less. If the isocyanate index is above 100, $W_{iso,stoic}$ is the weight of the polyisocyanate compounds which are needed to provide an isocyanate index of 100, i.e., one equivalent of isocyanate groups per equivalent of isocyanate-reactive groups supplied by the isocyanate-reactive compounds;

$E_{iso}$ is the average equivalent weight, per isocyanate group, of all polyisocyanate compounds;

$F_{iso}$ is the number average functionality (number of isocyanate groups per molecule) of polyisocyanate compounds; and $W_{iso,excess}$ is the weight of the polyisocyanate compounds, if any, in excess of that needed to provide an isocyanate index of 100.

As indicated by the foregoing formula, crosslinks form as a result of the presence of isocyanate-reactive compounds and/or isocyanate compounds that have a functionality of greater than 2, and/or an isocyanate index greater than 100.

The polyurethane polymer matrix preferably has a glass transition temperature of at least 80° C. and more preferably at least 130° C.

The isocyanate compounds used to make the polyurethane polymer matrix are compounds that contain two or more organic isocyanate groups per molecule. Aromatic isocyanate compounds are generally preferred. A more preferred isocyanate is methane diphenyldiisocyanate (MDI) and a still more preferred isocyanate compound is a polymeric MDI. By "polymeric MDI", it is meant a mixture of MDI with polymethylene polyphenylisocyanates that contain at least three phenylisocyanate groups. The MDI may be either the 2,4'- or the 4,4'-isomer, or a mixture of both. The MDI or polymeric MDI may be modified with carbodiimide, uretonimine, urethane or biuret linkages.

The isocyanate compounds preferably have an isocyanate equivalent weight of from 125 to 168 and an average isocyanate functionality of from 2.2 to 4.0. An especially preferred polyisocyanate is a polymeric MDI having an isocyanate equivalent weight of about 130 to 168 and an isocyanate functionality from 2.2 to about 3.5.

The isocyanate-reactive compounds are compounds that have two or more isocyanate-reactive groups per molecule. The isocyanate-reactive groups may be primary or secondary aliphatic hydroxyl groups, phenolic hydroxyl groups, primary or secondary amino groups (which may be aromatically or aliphatically bound), thiol groups, or other groups which can react with an isocyanate group to form a bond thereto. The isocyanate-reactive groups are preferably primary or secondary aliphatic hydroxyl groups and/or secondary amino groups. Primary or secondary aliphatic hydroxyl groups are most preferred isocyanate-reactive compounds in a spraying process because they provide beneficial curing rates.

The average equivalent weight per isocyanate-reactive group of the isocyanate-reactive compounds used to make the polyurethane polymer matrix preferably is from 125 to 300, although in the case of a mixture, individual isocyanate-reactive compounds in the mixture may have equivalent weights outside of this range, such as from about 30 to about 2000. The average functionality of the isocyanate-reactive compounds is preferably from 2.0 to 3.5 isocyanate-reactive groups per molecule, although in the case of a mixture individual isocyanate-reactive compounds may have functionalities as low as 1 or as high as 8.

Examples of hydroxyl-containing isocyanate-reactive compounds that are useful include ethylene glycol, diethylene glycol, triethylene glycol, propylene glycol, dipropylene glycol, tripropylene glycol, 1,4-butane diol, glycerin, trimethylolpropane, trimethylolethane, pentaerythritol, sorbitol, sucrose, diethanolamine, monoethanolamine, triethanolamine, polyether polyols including alkoxylates (especially ethoxylates and/or propoxylates) of any of the foregoing, polyester polyols, castor oil, the so-called "blown" soybean oil polyols, hydroxymethyl-containing polyols as described in WO 06/0293400, and the like.

The isocyanate-reactive compounds may include mixtures of two or more isocyanate-reactive compounds. Such mixture may include for example, (a) at least one polyol having a functionality of at least three and an equivalent weight of from 30 to 200 and (b) at least one polyol having a functionality of from 2 to 3 and a hydroxyl equivalent weight of from 500 to 2000. It is generally preferred that no greater than about 40%, more preferably no greater than 25% by weight of the isocyanate-reactive compounds have equivalent weights of 500 or more.

The isocyanate compounds and the isocyanate-reactive compounds are suitably combined at an isocyanate index of from 80 to 150, more preferably from 95 to 125 and still more preferably from 100 to 120, to form the polyurethane polymer matrix. The isocyanate index is 100 times the ratio of equivalents of isocyanate groups provided by the isocyanate compounds to equivalents of isocyanate-reactive groups provided by the isocyanate-reactive compounds. The isocyanate index is selected together with the functionalities and equivalent weights of the reactive materials so that the calculated molecular weight between crosslinks is as described before.

The polyurethane polymer matrix is a reaction product of the foregoing polyisocyanate compounds with the isocyanate-reactive compounds. The reaction of the isocyanate compounds with the isocyanate-reactive compounds may be performed in the presence of various other ingredients such as, for example, one or more reaction catalysts, a particulate filler, a silicone surfactant, a wetting agent, and the like. These other ingredients may be blended into either the isocyanate compound(s) or the isocyanate-re active compound(s), if desired.

Suitable catalysts include tertiary amine compounds and organometallic compounds, especially tin carboxylates and tetravalent tin compounds. Representative tertiary amine catalysts include trimethylamine, triethylamine, dimethylethanolamine, N-methylmorpholine, N-ethylmorpholine, N,N-dimethylbenzylamine, N,N-dimethylethanolamine, N,N,N',N'-tetramethyl-1,4-butanediamine, N,N-dimethylpiperazine, 1,4-diazobicyclo-2,2,2-octane, bis(dimethylaminoethyl)ether, bis(2-dimethylaminoethyl)ether, morpholine,4,4'-(oxydi-2,1-ethane diyl)bis, triethylenediamine, pentamethyl diethylene triamine, dimethyl cyclohexyl amine, N-cetyl N,N-dimethyl amine, N-coco-morpholine, N,N-dimethyl aminomethyl N-methyl ethanol amine, N,N,N'-trimethyl-N'-hydroxyethyl bis(aminoethyl)ether, N,N-bis(3-dimethylaminopropyl)N-isopropanolamine, (N,N-dimethyl) amino-ethoxy ethanol, N,N,N',N'-tetramethyl hexane diamine, 1,8-diazabicyclo-5,4,0-undecene-7, N,N-dimorpholinodiethyl ether, N-methyl imidazole, dimethyl aminopropyl dipropanolamine, bis(dimethylaminopropyl)amino-2-propanol, tetramethylamino bis(propylamine), (dimethyl (aminoethoxyethyl))((dimethylamine)ethyl)ether, tris(dimethylamino propyl)amine, dicyclohexyl methyl amine, bis(N,N-dimethyl-3-aminopropyl)amine, 1,2-ethylene piperidine and methyl-hydroxyethyl piperazine.

Examples of useful tin catalysts include stannous octoate, dibutyl tin diacetate, dibutyl tin dilaurate, dibutyl tin dimercaptide, dialkyl tin dialkylmercapto acids, dibutyl tin oxide, dimethyl tin dimercaptide, dimethyl tin diisooctylmercaptoacetate, and the like.

Catalysts are typically used in small amounts. For example, the total amount of catalyst used may be 0.0015 to 5, preferably from 0.01 to 2 parts by weight per 100 parts by weight of polyol or polyol mixture.

The polyol component may also contain a particulate filler, which may function as a colorant, to reduce cost, to reduce blistering or other surface defects, and/or to provide desirable physical and/or mechanical properties to the composite. The "filler" is different than the fiber in that it has an aspect ratio of less than 3.0 and preferably less than 2.0. The filler is in the form of particles that preferably have a longest dimension of from 50 nm to 1 mm. The filler particles more preferably have a longest dimension of from 1 microns to 500 microns. The filler particles are made of an inorganic or organic material that is thermally stable (i.e., does not undergo a change in physical state or engage in chemical reactions) at the processing temperatures encountered during the curing step. Examples of suitable fillers include calcium carbonate, talc, wollastonite, various clays, ground glass, carbon black, titanium dioxide, iron oxide, aluminum hydroxide, magnesium hydroxide and the like. Calcium carbonate is a preferred filler.

A suitable amount of the particulate filler, if present at all, is from 0.1 to 60% of the combined weights of the isocyanate compounds and the isocyanate-reactive compounds.

The particulate filler, is used, is conveniently blended into the isocyanate-reactive compound(s). In such a case, a wetting agent may be present, as the presence of the wetting agent can significantly reduce viscosity of the blend. Suitable wetting agents include certain acidic polyester and ammonium salts of acidic copolymers, as sold by BykUSA under the trade names BYK W985 and BYK W969. Wetting agents are generally useful in amounts ranging from about 0.25 to 3, preferably from 0.5 to 2 weight percent of the particulate filler.

An organosilicone surfactant may be present in either or both of the isocyanate compound(s) or the isocyanate-reactive compound(s). The surfactant suitably constitutes from 0.25 to 5, preferably from 0.5 to 2.5 percent of the total weight of the isocyanate-reactive component.

Blowing agents, including both chemical types such as water and physical types, are preferably used in small amounts if at all. It is preferred to omit water and other blowing agents from the polyurethane-forming formulation.

It is usually convenient to form a two-component reactive system, one component (the isocyanate component) containing the isocyanate compounds and the other (the polyol component) containing the isocyanate-reactive components, and to form the polyurethane polymer matrix by combining the two components to form a polyurethane-forming composition which is contacted with the reinforcing fibers and cured in the presence of the reinforcing fibers to form the polyurethane composite.

The viscosities of each of the isocyanate component and the polyol component are preferably no higher than 5000 mPa·s at 25° C., and more preferably no higher than 3000 mPa·s at 25° C., in order to facilitate processing, especially in a spraying process. The isocyanate component more preferably has a viscosity of no more than 500 mPa·s at 25° C.

The reinforcing material includes fibers that have diameters in the range of from 0.5 to 100 microns, preferably from 2 to 50 microns, and are made of a material that does not melt or thermally degrade at a temperature of less than 200° C. and which is stiffer than the polyurethane polymer matrix. The fibers have a length/diameter ratio of at least 20, preferably at least 100. The fibers may have lengths of 2 mm or longer or 5 mm or longer. Fibers that are randomly oriented in the composite preferably have lengths of from 12 to 150 mm.

Suitable fibers include, for example, glass fibers, boron fibers, other ceramic fibers, carbon fibers, metal fibers, natural fibers such as cotton and wool fibers, and synthetic polymer fibers that have the needed thermal stability and melting temperature. Glass fibers are preferred on the basis of cost, availability and performance.

The fibers may take various forms, including, for example, randomly oriented short (150 mm or less in length) fibers, non-woven or woven mats, continuous rovings, continuous fiber strands as described in U.S. Pat. No. 6,656,405, or other convenient form.

The polyurethane composite is formed by combining the isocyanate compounds and isocyanate-reactive compounds, contacting the resulting polyurethane-forming composition with the reinforcing fibers, and curing the polyurethane-forming composition in the presence of the reinforcing fibers. The process is performed in a manner such that the polyurethane-forming composition penetrates between the individual fibers and fills the spaces between them. After curing, the fibers are embedded in the polyurethane polymer matrix. To provide the desired high strength, the resulting composite preferably has a void volume of less than 15%, more preferably no more than 10%, still more preferably less than 5% and even more preferably less than 2%.

Various methods can be used to make the composite. Suitable methods include, for example, structural reaction injection molding (SRIM) methods, which include the steps of (A) introducing reinforcing fibers, typically in the form of a woven or non-woven mat, into the cavity of a mold, the (B) introducing the polyurethane-forming composition into the mold such that the polyurethane-forming composition penetrates between the reinforcing fibers and then (C) curing the polyurethane-forming composition in the presence of the fiber reinforcement material in the mold.

Another suitable manufacturing method is a reinforced reaction injection molding (RRIM) process, in which short (typically up to 150 mm, preferably from about 12-150 mm) fibers are dispersed in a liquid polyurethane precursor (typically the polyol component), which is passed through a mix-head where the precursor mixes with other reactants and then injected into a closed mold, where the reaction mixture cures to form a polyurethane polymer matrix in which the fibers are embedded.

A preferred manufacturing method is a spraying method. In a spraying method, short (up to 150 mm, preferably 12-150 mm, more preferably 25-150 mm and still more preferably 50-100 mm) fibers are wetted with a polyurethane-forming composition and the wetted fibers are sprayed into an open mold or onto a form. The fibers and the polyurethane-forming composition are conveniently dispensed through a mixhead and sprayed together into the mold or onto the form. The fibers are sometimes supplied to the process in the form of a continuous roving. In that case, the roving is chopped into discrete lengths immediately before being wetted with the polyurethane-forming composition. In some processes, the fiber is brought into a chamber in close proximity with the mixing head where a polyol component and a polyisocyanate component are mixed to form the polyurethane-forming composition. The fibers and polyurethane-forming composition are then dispensed together from the mixhead into the mold or onto the form. In other cases, the fibers and polyurethane composition are sprayed from the mixhead separately, but into each other, so the sprayed fibers become wetted as they travel towards the surface of the mold. Once the mold is filled, it is closed and the polyurethane-forming composition is cured in the mold to form the polyurethane composite. If a form is used rather than a mold, pressure is applied during the curing process. By "form", it is meant any surface upon which the fibers and polyurethane-forming composition are dispensed; the form may be, for example, a flat surface or a moving surface such as a conveyor belt. A double-band laminator is a suitable type of equipment for producing composite plates according to the invention, especially if the plates are few or no surface features.

A preferred type of mixhead for performing a spraying process includes a high pressure impingement mixer, by which the isocyanate-reactive compounds and the polyisocyanate compounds are brought into contact, mixed rapidly and brought into contact with the fibers. The fibers can be supplied in the form of continuous rovings that are chopped into the desired lengths immediately before being introduced into the mixhead. Mixheads of these types are commercially available. They include the "LFI" mixheads that are available from Krauss-Maffei.

In any of the foregoing processes, once the mold or form has been filled with the wetted fibers, pressure is applied (by closing the mold or otherwise and the polyurethane-forming composition is cured in the presence of the fibers. It is usually desirable to performing the curing step at an elevated temperature, such as from 50 to 120° C. The mold or form together with the applied wetted fibers is in that case heated together to the curing temperature. It is common to preheat the mold or form to the curing temperature. The polyurethane-forming composition is cured long enough that the composite can be demolded or removed from the form without permanent deformation or damage. The curing step generally requires from 0.5 to 60 minutes, depending on the particular polyurethane-forming composition, the dimensions of the part, and the curing temperature. The applied pressure during the curing step is sufficient to prevent expansion of the mold contents, thereby minimizing void content in the resulting composite and maximizing the mechanical properties of the composite.

The resulting polyurethane composite may constitute the entire plate. However, the plate may further include one or more additional layers, such as a coating layer one some or all of the exterior surfaces of the polyurethane composite, which may impart useful properties such as weather stability, a higher coefficient of friction (for skid or slip resistance) or may be present for aesthetic reasons. A non-skid or non-slip coating on at least one surface is often beneficial. Such a coating may be a polyurethane polymer layer. Polymer coating layers can be produced in various manners, such as by applying a powder coating, in-mold paint, thermoplastic film and/or gel coating composition to the surface of the mold, then introducing the fiber reinforcement and the polyurethane-forming composition into the mold and curing the polyurethane-forming composition (and the coating material if necessary. A coating also can be applied after the curable composition of this invention is cured, using techniques such as high-pressure injection in-mold coating processes or via common, post-demold painting or coating methods.

It is also possible to introduce additional layers to the plate, in addition to or in place of the aforementioned coating. For example, one or more additional layers can be interposed between a show surface layer and the polyurethane composite. Alternately or in addition, one or more additional layers can be applied atop the polyurethane composite.

The plate may also include functional parts such as handles. These can be attached to the composite during the molding process, or attached to a previously-formed composite, or to a coating layer.

A plate of the invention that has a clear opening of less than 450 mm preferably exhibits a permanent set of no greater than 6.5 mm and more preferably no greater than the clear opening divided by 50. A composite plate of the invention that has a clear opening of 450 mm or greater preferably exhibits a permanent set of no greater that the clear opening divided by 100. The permanent set of the plate in most cases is almost entirely due to the fiber-reinforced polyurethane composite. Therefore, the fiber-reinforced polyurethane composite should by itself exhibit these permanent set values.

A plate of the invention that has a clear opening of less than 250 mm preferably exhibits a load bearing capacity, in kilonewtons (kN), equal to at least the clear opening divided by 250. A plate of the invention that has a clear opening of 250 mm or more preferably exhibits a load bearing capacity of at least 125 kilonewtons. The load bearing of the plate is almost entirely due to the fiber-reinforced polyurethane composite. Therefore, the fiber-reinforced polyurethane composite should by itself exhibit these load bearing values.

The following examples are provided to illustrate the invention but are not intended to limit the scope thereof. All parts and percentages are by weight unless otherwise indicated.

EXAMPLE 1-7

Circular plates having a diameter of 250 mm and a thickness of 15 mm in the central flat area and 40 mm at the rim are prepared in the following manner.

The polyol composition is prepared by blending 16 parts of an 84 equivalent weight propoxylate of glycerin, 10 parts of a 59 equivalent weight propoxylate of trimethylolpropane, 20 parts of a 1000 equivalent weight polypropylene oxide) diol, 13.3 parts castor oil, 2 parts of a 50/50 mixture of castor oil and sodium aluminum silicate molecular sieve, 37 parts of a 156 equivalent weight, 4.7 functional propoxylate of a glycerin/sucrose mixture, 0.7 parts of a 33% solution of triethylene diamine in a diol solvent and 1 part of a black paste (colorant). This polyol composition has an average hydroxyl equivalent weight of 148 and an average functionality of 3.37. Its viscosity is 1400 mPA·s at 25° C.

The polyol composition, a polymeric MDI having an average functionality of 2.45, an equivalent weight of 134 and a viscosity of 130 mPa·s, and glass fibers are processed through a Krauss-Maffei "LFI" mixhead and sprayed into a mold having dimensions corresponding to those of the finished part. The isocyanate index is 105. The calculated molecular weight between crosslinks for this system is 464.

The fiber content and fiber length are varied. After filling the mold, the mold is closed and the contents heated at 65° C. for 5 minutes at an applied pressure of 50 bars. The resulting plates are demolded.

Table 1 sets forth the fiber length and fiber content of each of Examples 1-7.

TABLE 1

| Ex. No. | Fiber Content, Wt. - % | Fiber Length, mm |
|---|---|---|
| 1 | 30 | 25 |
| 2 | 30 | 50 |
| 3 | 30 | 100 |
| 4 | 40 | 25 |
| 5 | 40 | 50 |
| 6 | 40 | 100 |
| 7 | 50 | 100 |

The load bearing capacity and permanent set of composite plate Examples 1-7 are evaluated. Increasing fiber length (through the range of 25 to 100 mm) tends to lead to higher load bearing capacity and lower permanent set, as does higher fiber content. At fiber contents of 40% or higher, permanent set is typically below 5 mm and load bearing capacity is typically 135 kN or higher.

EXAMPLE 8

A plaque having a thickness of 15 mm is prepared for evaluation of physical properties in the following manner. The polyol composition and the polyisocyanate are the same as that described in Examples 1-7.

The polyol composition, polyisocyanate and 25 mm glass fibers are processed through a Krauss-Maffei "LFI" mixhead and sprayed into a mold. The isocyanate index is 110. The fiber content is 40% by weight.

After filling the mold, the mold is closed and the contents heated at 65° C. for 5 minutes at an applied pressure of 50 bars. The resulting plates are demolded. Specimens are cut from the plates and tested for Charpy Impact Strength (DIN ISO 179-2, on 5 mm-thick samples), flexural properties (UNI EN ISO 178, on 15 mm-thick samples with 100 mm span), tensile properties (ISO 527-2, on 7 mm-thick samples), water absorption (ISO 62) and flame spread (EN ISO 11925-2). Results are as indicated in Table 2.

TABLE 2

| Property | Result |
|---|---|
| Fiber content, % by weight | 40 |
| Fiber length, mm | 25 |
| Flexural Modulus, MPa | 7000 |
| Flexural Strain, mm | 6.24 |
| Flexural Strength, MPa | 249 |
| Tensile Strength, N/mm$^2$ | 126 |
| Elongation to break, % | 1.8 |
| Tensile Modulus, MPa | 6750 |
| Impact Energy, KJ/m$^2$ | 72 |
| Water absorption, after 120 hours @25° C. | 0.141% |
| Surface Flammability | Euroclass Efl rating (EN 13501) |

EXAMPLES 9 and 10

Square plates having dimensions of 400×400 mm and a thickness of 15 mm in the central flat area and 40 mm at the rim are prepared in an SRIM process, using the same polyol and isocyanate compositions as described for Examples 1-7. The fibers in this case are flat woven fiberglass mats. The fiber content is 23% in each case.

The fiberglass mats are inserted into the mold and the polyurethane-forming composition is injected into the mold, filling the mold and penetrating between the fibers in the mat. The polyurethane-forming composition is cured in the mold at 75° C. for 10 minutes. Load bearing for each of Examples 8 and 9 is in excess of 170 kN.

EXAMPLE 11

Example 9 is repeated, using the following polyurethane-forming composition:

Polyol component: 99.95 parts of a 200 molecular weight poly(ethylene glycol) and 0.05 parts of a tin catalyst.

Polyisocyanate component: a mixture of a polymeric MDI and a prepolymer of MDI and tripropylene glycol. This mixture has an average functionality of 2.3 and an equivalent weight of 154.

The isocyanate index is 110, and the calculated molecular weight between crosslinks is 2010.

The invention claimed is:

1. A fiber-reinforced polyurethane composite plate having a thickness of at least 12 mm, wherein the fiber-reinforced polyurethane composite contains at least 20% by weight of reinforcing fibers embedded in a polyurethane polymer matrix which is a reaction product of a polyurethane-forming formulation that omits water and other blowing agents, which polyurethane polymer matrix has a calculated molecular weight between crosslinks of from 430 to 2500, wherein the fibers have lengths of from 12 to 150 mm and are randomly oriented in the polyurethane polymer matrix and the polyurethane polymer matrix is a reaction product of an isocyanate composition that includes polymeric MDI and has an isocyanate equivalent weight of from 125 to 168 and an average isocyanate functionality of from 2.2 to 4.0, and a polyol composition that contains isocyanate-reactive compounds having an average equivalent weight per isocyanate-reactive group of from 125 to 300 and an average of from 2.0 to 3.5 isocyanate-reactive groups per molecule.

2. The composite plate of claim 1 which has a width of at least 150 mm.

3. The composite plate of claim 2 wherein the fiber-reinforced polyurethane composite has a thickness of at least 25 mm.

4. The composite plate of claim 3, wherein the fiber-reinforced polyurethane composite contains from 30 to 60% by weight fibers.

5. A process for preparing a composite plate of claim 1, comprising spraying fibers wetted with the polyurethane-forming composition into a mold or onto a form, closing the mold or applying pressure to the form and curing the polyurethane-forming composition in the mold or on the form.

6. A process for preparing a composite plate of claim 1, comprising (A) introducing the fibers into the cavity of a mold, (B) introducing the polyurethane-forming composition into the mold such that the polyurethane-forming composition penetrates between the fibers and (C) curing the polyurethane-forming composition in the presence of the fibers in the mold.

* * * * *